(12) United States Patent
Watson et al.

(10) Patent No.: US 11,853,877 B2
(45) Date of Patent: Dec. 26, 2023

(54) TRAINING TRANSFER-FOCUSED MODELS FOR DEEP LEARNING

(71) Applicant: International Business Machines Corporation, Armonk, NY (US)

(72) Inventors: Patrick Watson, Montrose, NY (US); Bishwaranjan Bhattacharjee, Yorktown Heights, NY (US); Siyu Huo, White Plains, NY (US); Noel Christopher Codella, White Plains, NY (US); Brian Michael Belgodere, Fairfield, CT (US); Parijat Dube, Yorktown Heights, NY (US); Michael Robert Glass, Bayonne, NJ (US); John Ronald Kender, Leonia, NJ (US); Matthew Leon Hill, Yonkers, NY (US)

(73) Assignee: International Business Machines Corporation, Armonk, NY (US)

( * ) Notice: Subject to any disclaimer, the term of this patent is extended or adjusted under 35 U.S.C. 154(b) by 823 days.

(21) Appl. No.: 16/373,149

(22) Filed: Apr. 2, 2019

(65) Prior Publication Data

US 2020/0320379 A1    Oct. 8, 2020

(51) Int. Cl.
  *G06N 3/08* (2023.01)
  *G06N 3/04* (2023.01)
(52) U.S. Cl.
  CPC ............. *G06N 3/08* (2013.01); *G06N 3/04* (2013.01)
(58) Field of Classification Search
  CPC .......... G06N 3/08; G06N 3/04; G06N 3/0454; G06N 20/00; G06N 3/02
  See application file for complete search history.

(56) References Cited

U.S. PATENT DOCUMENTS

| 6,625,585 | B1 | 9/2003 | MacCuish et al. |
| 9,183,285 | B1 | 11/2015 | Brown et al. |
| 9,411,632 | B2 | 8/2016 | Guedalita et al. |
| 9,477,781 | B2 | 10/2016 | Shyr et al. |
| 9,792,898 | B2 | 10/2017 | Chu et al. |
| 9,817,919 | B2 | 11/2017 | Aila et al. |
| 11,138,520 | B2 * | 10/2021 | Ganti ............ G06N 20/00 |
| 2009/0141969 | A1 | 6/2009 | Yu et al. |

(Continued)

FOREIGN PATENT DOCUMENTS

| EP | 3276540 A2 * | 1/2018 | ............... G06F 5/01 |
| WO | WO-2020048594 A1 * | 3/2020 | ........... G06N 3/0454 |

OTHER PUBLICATIONS

Yao et al., Boosting for transfer learning with multiple sources, Jun. 2010, 2010 IEEE Computer Society Conference on Computer Vision and Pattern Recognition, 2010, pp. 1855-1862, doi: 10.1109/CVPR.2010.5539857 (Year: 2010).*

(Continued)

*Primary Examiner* — Ryan C Vaughn
(74) *Attorney, Agent, or Firm* — Scully, Scott, Murphy & Presser, P.C.; Caleb Wilkes (57) ABSTRACT

Whether to train a new neural network model can be determined based on similarity estimates between a sample data set and a plurality of source data sets associated with a plurality of prior-trained neural network models. A cluster among the plurality of prior-trained neural network models can be determined. A set of training data based on the cluster can be determined. The new neural network model can be trained based on the set of training data.

20 Claims, 8 Drawing Sheets

(56) References Cited

U.S. PATENT DOCUMENTS

| | | | |
|---|---|---|---|
| 2013/0198191 | A1 | 8/2013 | Lara Hernandez et al. |
| 2015/0040028 | A1 | 2/2015 | Honkala |
| 2015/0235143 | A1 | 8/2015 | Eder |
| 2015/0254555 | A1 | 9/2015 | Williams, Jr. et al. |
| 2016/0342677 | A1 | 11/2016 | Nuchia et al. |
| 2017/0235820 | A1 | 8/2017 | Conrad et al. |
| 2017/0316281 | A1 | 11/2017 | Criminisi et al. |
| 2018/0197111 | A1 | 7/2018 | Crabtree et al. |
| 2020/0090009 | A1* | 3/2020 | Arora .................. G06K 9/6269 |
| 2020/0272805 | A1* | 8/2020 | Flanagan ............ G01N 15/1475 |

OTHER PUBLICATIONS

Bakker et al., "Clustering Ensembles of Neural Network Models," in 16 Neural Networks 261-69 (2003). (Year: 2003).*

Valov, P., et al., "Transferring Performance Prediction Models Across Different Hardware Platforms", ICPE'17, Apr. 22-26, 2017, pp. 39-50.

Jamshidi, P., et al., "Transfer Learning For Improving Model Predictions In Highly Configurable Software", arXiv: 1704.00234v2, Apr. 20, 2017, 11 pages.

Kamvar, S.D.,et al., "Interpreting And Extending Classical Agglomerative Clustering Alorgithms using a Model-Based Approach", ICML'02, Jul. 8-12, 2002, 8 pages.

Yildirim, P., et al., "K-Linkage: A New Agglomerative Approach for Hierarchical Clustering", Advances In Electrical and Computer Engineering, 2017, pp. 77-88, vol. 17, Issue 4.

Ge, et al., "Borrowing Treasures from the Wealthy: Deep Transfer Learning through Selective Joint Fine-Tuning", 2017 IEEE Conference on Computer Vision and Pattern Recognition (CVPR), Jul. 21-26, 2017, 10 pages.

Mahajan, D., et al., "Advancing state-of-the-art image recognition with deep learning on hashtags", AI Research, Applied Machine Learning, May 2, 2018, 2 pages.

Ben-David, S., et al., "A notion of task relatedness yielding provable multiple-task learning guarantees", Mach Learn, Received Feb. 21, 2007, Revised Nov. 25, 2007, Accepted Dec. 10, 2007, Published online Jan. 8, 2008, pp. 273-287.

Zamir, A.R., et al., "Taskonomy: Disentangling Task Transfer Learning", http://taskonomy.stanford.edu/taskonomy_CVPR2018.pdf, Accessed on Apr. 2, 2019, 12 pages.

* cited by examiner

TRAINING TRANSFER-FOCUSED MODELS FOR DEEP LEARNING

BACKGROUND

The present application relates generally to computers and computer applications, and more particularly to artificial intelligence, machine learning and transfer learning.

Transfer learning in deep learning uses a pre-trained or prior-trained model on a different problem. With transfer learning, deep neural networks can be trained with relatively small data. Generally, knowledge or weights learned by a prior-trained model is transferred to learn a new model for a new task.

BRIEF SUMMARY

A method, in one aspect, may include receiving a similarity estimate between a sample data set and a source data set associated with a prior-trained neural network model. A plurality of similarity estimates can be received corresponding to a plurality of source data sets associated with a plurality of prior-trained neural network models. The method may also include, at least based on the similarity estimates, determining whether to train a new neural network model. The method also includes, responsive to determining to train the new neural network model, creating a cluster among the plurality of prior-trained neural network models. The method may also include determining a set of training data based on the cluster. The method may also include training the new neural network model based on the set of training data.

A system, in one aspect, may include a hardware processor. A memory device may be coupled with the hardware processor. The hardware processor may be operable to receive a similarity estimate between a sample data set and a source data set associated with a prior-trained neural network model, wherein a plurality of similarity estimates are received corresponding to a plurality of source data sets associated with a plurality of prior-trained neural network models. The hardware processor may be further operable to determine, at least based on the similarity estimates, whether to train a new neural network model. The hardware processor may be further operable to, responsive to determining to train the new neural network model, create a cluster among the plurality of prior-trained neural network models. The hardware processor may be further operable to determine a set of training data based on the cluster. The hardware processor may be further operable to train the new neural network based on the set of training data.

A computer readable storage medium storing a program of instructions executable by a machine to perform one or more methods described herein also may be provided.

Further features as well as the structure and operation of various embodiments are described in detail below with reference to the accompanying drawings. In the drawings, like reference numbers indicate identical or functionally similar elements.

DETAILED DESCRIPTION

A system, method and technique are disclosed, which can train a transfer-focused model for machine learning such as deep learning. In one aspect, a new model may be learned, which for example, may fill a gap existing in a prior-trained model or prior trained models. For instance, a gap may occur if a prior-trained model's data used to train that prior-trained mode are relatively small. As another example, the data used to train a prior-trained model may be distant from a desired model. In one aspect, a new model may evolve a prior-trained model as new data are acquired. Such a new model can be used as a base model for transfer learning.

In one embodiment, a system and/or method can include creating a map of areas prior-trained models cover (also referred to as covered areas) and gaps in the areas (of prior-trained model space). The data which are used to generate the map (e.g., labeled images) can be clustered. This data can be clustered (e.g., using an agglomerative clustering technique), to identify one or more clusters of prior-trained models with similar information. Information of prior-trained models in a cluster can be combined. A cluster-cut size can be optimized based on the size of data available in each cluster. In one aspect, a cluster can be augmented by labeled data keyword search. For example, the cluster is labeled with the category label of the images in it. As an example, a cluster containing mostly dog images can be labeled "dog." Data of the prior-trained models in a cluster can be combined or batched, with which a new model can be trained. A new model can be trained to meet a desired requirement, for example, data size, and/or transfer value optimization, and/or another.

In one embodiment, a model can be an artificial neural network model, also referred to as a neural network model. An embodiment of an implementation of an artificial neural network can include a succession of layers of neurons, which are interconnected so that output signals of neurons in one layer are weighted and transmitted to neurons in the next layer. A neuron $N_i$ in a given layer may be connected to one or more neurons $N_j$ in the next layer, and different weights $w_{ij}$ can be associated with each neuron-neuron connection $N_i$-$N_j$ for weighting signals transmitted from $N_i$ to $N_j$. A neuron $N_j$ generates output signals dependent on its accumulated inputs, and weighted signals can be propagated over successive layers of the network from an input to an output neuron layer. An artificial neural network machine learning model can undergo a training phase in which the sets of weights associated with respective neuron layers are determined. The network is exposed to a set of training data (e.g., image data), in an iterative training scheme in which the weights are repeatedly updated as the network "learns" from the training data. The resulting trained model, with weights defined via the training operation, can be applied to perform a task based on new data.

In one embodiment, a system and/or method can include identifying and/or scheduling of a training of a "transfer model", for example, based on estimates of transfer performance. The term "transfer model" can refer to a model that can be used specifically to train a model on a different task than the one that was used to train that model. A synonym or another term for "transfer model" is "source" model for a "target" task. A transfer model can be used as a basis for further training. New examples can be batched for training based on a state of existing (or prior-trained) transfer models and one or more estimates of one or more future training jobs.

In one embodiment, a system and/or method can include estimating or determining an impact of training a new transfer model, based on a sample or a set of existing transfer models, for example, based on an estimate of future performance of the set of existing transfer models. Based on such an estimate of future performance of the set of existing transfer models, a system and/or method in one embodiment can create a data batch and train a new transfer model. In another aspect, based on such an estimate of future performance of the set of existing transfer models, a system and/or method in one embodiment can create a data batch and schedule to train a new transfer model. A data batch can include all of the data points within one of the clusters.

In one embodiment, a system and/or method can include computing hierarchical agglomerative clustering (Agnes) on data, for example, feature vectors resulting from running prior-trained models. For instance, a hierarchy can be defined on prior-trained models, wherein $\max\{d(a,b):a$ is an element of A, b is an element of B$\}$.

A dynamic threshold can be set for cluster size with $DKL*1.5 \log (Icurrent) > c*1.5 \log (Inew)$. This is equivalent to measuring the data-size weighted distance within a category relative to the data-size weighted distance between a category and an existing or prior-trained model (such as one existing in a database of image recognition models). "Icurrent" refers to the data set size of a current transfer model being considered; "Inew" represents the size of a new data set. DKL refers to Kullback-Liebler Divergence. "c" represents a constant value. In response to the distance exceeding the dynamic threshold, a new image set can be batched and a model can be retrained.

Figure 1:
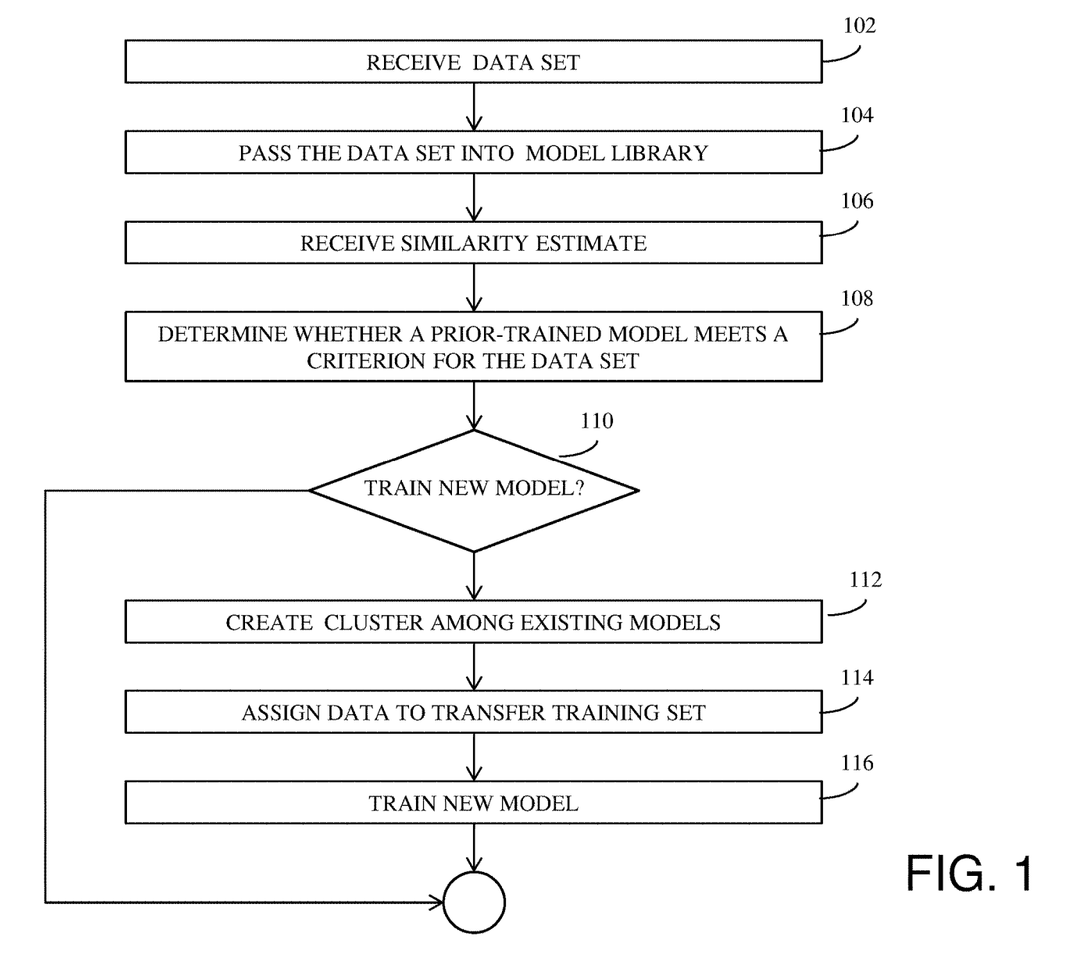
FIG. 1 is a flow diagram illustrating a method in one embodiment.

FIG. 1 is a flow diagram illustrating a method in one embodiment. At 102, a data set is received. For instance, such data set can be received via an application programming interface (API) or another interface, for example, online. A user, for example, can input a sample data set. in another example, the data set may be stored, and for example, received from a storage device. As an example, the data set may be an image data set, or other data such as but not limited to: video, audio, text, speech, combination thereof, and/or another.

At 104, the data set is passed into a model library. For instance, a model library may include one or more of existing or prior-trained models. In one aspect, a model library may be hosted on a cloud-based computing system, a server or another computer system. A model library may be a database storing existing or prior-trained models. The data set can be used as input to a model in the model library, and the model may be run based on the data set. The model outputs a result, for example, a classification. This processing can be done for a plurality of models in the model library. As an example, a model or a plurality of models that are run can be image classification models.

At 106, an estimate of similarity between the data set (e.g., received at 102) and a target layer of the model is received. A target layer can be a layer of artificial neurons within a neural network such as a deep-learning model. A model library may return an estimate of data similarity to a target layer of a model in the model library. In one embodiment, a method that measures the similarity between data sets can be used to identify which layers in a deep learning network or elements in an ensemble network are most similar to the data set. This measure represents the estimate of individual data set similarities to the target layers. For example, if the dataset pertains to an image, the similarity of such image data to a model's feature vector may be returned, e.g., an estimate of individual image similarity to a target layer. In one aspect, if multiple models are run, multiple of such estimates may be returned, for example, each for a model that is run. Co-owned U.S. patent application Ser. No. 15/982,622 filed on May 17, 2018 and entitled, "Identifying Transfer Models for Machine Learning Tasks," describes determining similarity metrics between data sets. That application is incorporated by reference herein in its entirety.

In an embodiment, the estimate of data similarity can be determined as follows. For example, a method may include comparing one or more source data sets of one or more pre-trained neural network models and one or more target data sets associated with one or more target machine learning tasks to assess one or more similarity metrics. The one or more predefined neural network models can be identified from a library of models. A source data set of a pre-trained neural network model can be a data set used to train that pre-trained neural network model. A target data set associated with a target machine learning task can be a data set received (also referred to as a received data set or a given data set), for example, at 102.

A functionality, for example, having access to the model library may perform the comparison and return a similarity metric (e.g., an estimate of data similarity). One specific implementation may include passing a target data set (e.g., the received data set) in a forward pass through a pre-trained neural network model. The pre-trained neural network model can generate a feature descriptor (e.g., feature vector) characterizing the target data set. For example, one or more layers (e.g., a penultimate layer or a prior layer) of the pre-trained neural network model can produce a feature vector representing one or more target features, also referred to as a target feature representation.

A feature descriptor (e.g., feature vectors) characterizing a source data set can exist or can be generated, for example, for each of a plurality of pre-trained neural network models in the model library. A "source data set" can refer to a data set used to train that pre-trained neural network model. For instance, a pre-trained neural network model can generate a feature descriptor (e.g., a feature vector) characterizing a source data set. One or more layers (e.g., a penultimate layer or a prior layer) of the pre-trained neural network model can produce a feature vector representing one or more source features, also referred to as a source feature representation, for example, responsive to passing in a forward pass the source data set through the pre-trained neural network model. As an example, a pre-trained neural network model can be a convolutional neural network (CNN), and a CNN layer's (e.g., any one or more layers of the CNN such as a penultimate layer, but not limited to that layer) feature vector can be used.

Hence, there can be a target feature representation and a source feature representation with respect to a pre-trained neural network model assessed. Each of a plurality of pre-trained neural network models can have associated with it a target feature representation and a source feature representation. The target feature representation can characterize a sample data set (e.g., the received data set) with respect to a given pre-trained neural network model. The source feature representation can characterize the source data set with respect to the given pre-trained neural network model. In one aspect, a target feature representation and/or a source feature representation may be computed from a variety of feature spaces and/or levels in the respective pre-trained neural network model.

A similarity metric between a target feature representation of a given pre-trained neural network model and a source feature representation of the given pre-trained neural network model can be computed. For example, a distance computation technique can be utilized to assess the similarity and/or dissimilarity between the target feature representation and the source feature representation. Example distance computation techniques can include, but are not limited to: Kullback-Leibler divergence ("KL-divergence"), Euclidean distance ("L2 distance"), cosine similarity, Manhattan distance, Minkowski distance, Jaccard similarity, Jensen Shannon distance, chi-square distance, a combination thereof, and/or the like. The similarity metric can indicate how similar and/or dissimilar the sample data set (e.g., the received data set) is from the source data set. In one aspect, such a similarity metric can be determined at different feature spaces and/or at different levels in a respective pre-trained neural network model.

In one or more embodiments, an identification component can identify one or more pre-trained neural network models from a library of models to serve as one or more transfer models based on the similarity metrics and a similarity threshold. For example, the identification component can identify one or more pre-trained neural network models based on a comparison of the similarity metrics with each other and with the similarity threshold. The similarity threshold can be defined by a user (e.g., via the one or more input devices and/or networks) and can represent a minimal metric that must be met by a respective similarity metric to qualify the associated pre-trained neural network model for identification.

At 108, based on the returned estimate, it is determined whether a prior-trained model meets a criterion for the data set. For example, it is determined whether the estimate (e.g., the similarity metric) meets a predefined threshold. The predefined threshold can be a distance threshold. For instance, the criterion may be met if the estimate is within the predefined threshold or distance threshold. This implies that the data set used to train the prior-trained model is close (within the threshold distance) to the received data set. In that case, a prior-trained model that is determined to be "close" can be used for transfer learning for the received data set, and it may be that a new model for transfer learning need not be trained. For instance, the similarity metrics regarding assessed pre-trained network models can be used to identify which of the assessed pre-trained network models (e.g., of the model library) best fit the sample or target data set (e.g., the received data set), and thus can provide enhancement to the target machine learning task. In this way, one or more assessed pre-trained neural network models can be identified, which are determined to have the closest correlation, based on the similarity metrics, to the target data set, as compared to other assessed pre-trained neural network models. Thus, in one aspect, based on the assessed similarity metrics, one or more pre-trained neural network models can be identified, which could serve as transfer models to analyze the target data set and enhance the performance of the target machine learning task.

In one aspect, the predefined threshold is also referred to as a transfer cut-off or threshold. In one embodiment, such transfer cut-off may be configurable. For instance, a user may define the transfer cut-off. As another example, the transfer cut-off may be automatically determined by a system. For instance, a system executes an algorithm such as KDL*1.5 log (setsize) to automatically configure the transfer cut-off. "Setsize" represents the size of a data set.

Responsive to determining that a prior-trained model meets a criterion for the data set, the processing may return. Responsive to determining that no prior-trained model meets a criterion for the data, the processing may proceed to 110. In this case, based on the similarity metric, a determination or decision may be made that there may be a gap in the existing models, or lack of a model among the assessed pre-trained neural network models, which could best serve as a model for transfer learning for the sample (or target) data set (e.g., the received data set). In such a case, a new model may be built or trained for the sample data set to serve as a model for transfer learning for performing a new task associated with the sample data set.

At 110, it is determined whether a new transfer model (a model that can be used in transfer learning) is to be trained. In one aspect, a user feedback may be received, for instance, responsive to asking if the user would like to train a new transfer model. In another aspect, whether to train a new transfer model may be determined automatically, for example, by autonomously or automatically computing a cost associated with training of a new transfer model.

At 112, responsive to determining that a new transfer model is to be trained, a cluster is created among existing models with a center near the data set received at 102. Clustering, for example, includes clustering the target feature representations of assessed plurality of prior-trained models (e.g., pre-trained neural network models). A cluster closest to the target data set can be selected (e.g., having the highest similarity metric). For example, a set of data is applied to an existing model to create a set of activations. The method in one embodiment clusters these activations. For instance, the method in one embodiment clusters the model estimates or feature vectors. In one aspect, this clustering identifies clusters of models with similar information to combine. A clustering technique such as, but not limited to, hierarchical agglomerative clustering (Agnes) can be used.

Generally, the method may use an existing model set (e.g., a plurality of models in the model library) to create a new data set from raw input data. The method may use this new data set to gain insights about how to select an appropriate transfer model or to create a new transfer model. In one embodiment, the method creates a cluster, which can help with building a transfer model. For instance, the method may divide and merge clusters on the basis of likelihood to enhance transfer, which is a property of the data's relationship with pre-trained transfer models. In one embodiment, the method may provide a function describing the value of the clustered features for transfer learning.

A cluster size or a data set size may be configured, for example, based on available computational resources. For example, a user can be allowed to choose a data set size that matches the computational resources available to the user and then create a number of clusters such that each cluster contains that amount of data.

At 114, data (e.g., images) are assigned, for example, in batch, to a transfer training set. A set of data (source data set) used in training the prior-trained models identified by the clustering at 112 is put onto a list. For instance, the source data sets used in training the prior-trained models in a selected cluster are combined and used as a training set for the new transfer model. The data, for example, may include images, numerical data, time series data, and/or another type of data.

At 116, a new transfer model is trained based on the data (e.g., images, numerical data, time series data, and/or another type of data). For instance, training can include forward propagation and backpropagation techniques and learning the parameters such weights and bias of the model, e.g., a neural network model. In one aspect, a model to be trained can begin with a random initial set of parameters. In another aspect, the model to be trained may start with a set of parameters computed in the prior-trained models. Yet in another aspect, at least some of the hyperparameters associated with the prior-trained models can be used in training the new transfer model.

In embodiments, as described above, a system and/or method can predict which models and datasets are valuable for training a transfer model. In one embodiment, the method produces a set of transfer models by recombining existing transfer models. In one embodiment, the method may include organizing pre-trained models into clusters (e.g., create clusters of related transfer models), and using those clusters to predict the optimal set of data upon which to train new transfer models. In one embodiment, the method may, for example using clustering, identify relatively balanced, representative, and multi-domain data sets to use to create a model that is easy to fine-tune with new data.

In one aspect, a methodology of the present disclosure can recognize and train deep learning models on smaller data sets more efficiently. An existing model can be fine-tuned or a new model can be created based on a batch of data. Data labels may be used to identify a cluster of features that can be imported. A methodology described in the present disclosure can be applied to domains other than vision. A methodology of the present disclosure can improve training accuracy and leverage smaller data.

In one embodiment, a similarity estimate or measure may be computed as follows. A data set is received or obtained. The data set is passed (in forward propagation) through a pre-trained or prior-trained model.

Image feature extraction is performed as follows. For example, a pre-trained model's penultimate layer output can be used as feature vectors, and each category's (or model's) average feature vectors can be computed as a category feature representation. For instance, all data points may have labels and category groupings (e.g., a picture of a German shepherd says "German Shepherd" and "dog"). Pre-trained models are also referred to as prior-trained models. A pre-trained model's penultimate layer contains feature vectors, which for instance can be input to a classifier. Feature representation is computed for both source and target data sets. A source data set refers to data used to train the original transfer learning model (also referred to as transfer model). A target data set refers to new data for a new task to which features from the previous training are to be transferred. Feature extraction can be repeated for other layers of the pre-trained model.

A similarity (or dissimilarity) measure can be computed as follows in one embodiment. This similarity or dissimilarity measure in one embodiment computes similarity or dissimilarity between source and target datasets. As an example, a Kullback-Liebler (KL) divergence technique can be used:

$$D_{KL}(P\|Q) = \sum_i P(i)\log\frac{P(i)}{Q(i)}.$$

Q typically represents a theory, model, description, or approximation of P. $D_{KL}$(target $\|$ source) may be computed as dissimilarity scores between source and target dataset to measure how they are different from each other. For example, 0 output may mean similar, and 1 output may mean dissimilar (0: similar, 1: dissimilar).

In one embodiment, hierarchical agglomerative clustering (Agnes) on Q can be computed as follows. Define a hierarchy on the existing models with max{d(a,b):a∈A, b∈B}. D is a distance function, a and b are the data sets contained in spaces A and B. A dynamic threshold is set for cluster size with $D_{KL}*1.5$ log (Icurrent)>c*1.5 log (Inew). "Icurrent" and "Inew" represent the size of the data, for example, number of examples, in the current and new dataset respectively.

In one aspect, this is equivalent to measuring the data-size weighted distance within a category relative to the data-size weighted distance between a category and an existing model or prior-trained model. Responsive to determining that this value (the data-size weighted distance) exceeds the dynamic threshold, the "Inew" image set is batched and a model is retrained. The model that is retrained is the transfer model used for future training. The "Inew" image set includes the data set used to train the prior-trained models identified by the clustering at 112.

In one aspect, a method may include predicting which models and datasets are valuable for training a transfer model. A method, in one aspect, may create clusters that help with building a transfer model. A method, in one aspect, may divide and merge clusters on the basis of likelihood to enhance transfer, for example, which is a property of the data's relationship with a pre-trained transfer model. In one aspect, a method may create clusters of related transfer models. For example, clustered features can be used in transfer learning. In one aspect, a method may predict a model that can provide a best transfer. For instance, a method may include organizing pre-trained models into clusters, and using those clusters to predict an optimal set of data to train in a new transfer model. A method, in one aspect, may identify relatively balanced, representative, and multi-domain data sets to use to create new models that can be fine-tuned with new data.

Figure 2:
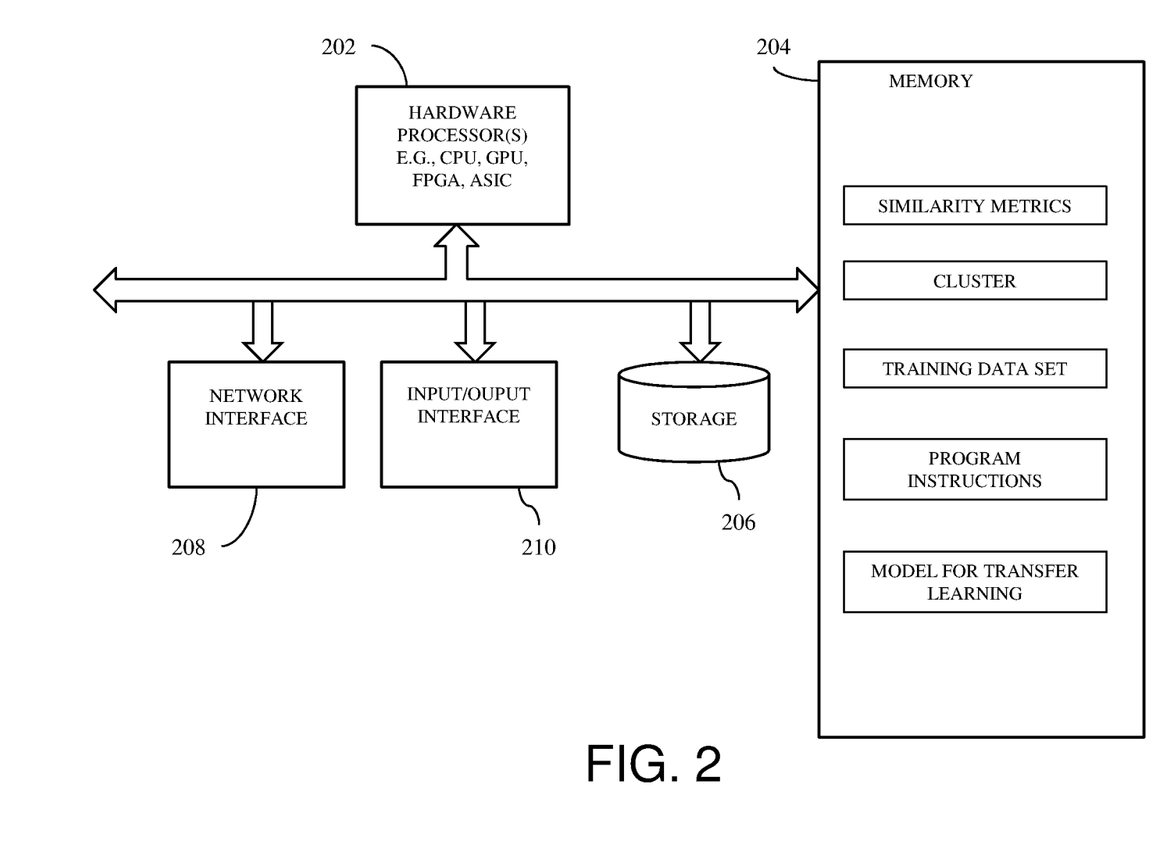
FIG. 2 is a diagram showing components of a system in one embodiment.

FIG. 2 is a diagram showing components of a system in one embodiment, which can train transfer-focused models for deep learning. One or more hardware processors 202 such as a central processing unit (CPU), a graphic process unit (GPU), and/or a Field Programmable Gate Array (FPGA), an application specific integrated circuit (ASIC), and/or another processor, may be coupled with a memory device 204, and may determine to train and/or train a new transfer model. A memory device 204 may include random access memory (RAM), read-only memory (ROM) or another memory device, and may store data and/or processor instructions for implementing various functionalities associated with the methods and/or systems described herein. One or more processors 202 may execute computer instructions stored in memory 204 or received from another computer device or medium. A memory device 204 may, for example, store instructions and/or data for functioning of one or more hardware processors 202, and may include an operating system and other program of instructions and/or data. One or more hardware processors 202 may receive input comprising a data set. In one aspect, the data set may be stored on a storage device 206 or received via a network interface 208 from a remote device, and may be temporarily loaded into a memory device 204. At least one hardware processor 202 may determine to train a new transfer model, for example, based on an estimate of future performance of one or more existing models. For instance, at one hardware processor 202 may receive a similarity estimate between the dataset and a result of a model in the model library. At least one hardware processor 202 may further determine, at least based on the similarity estimate meeting a threshold, to train a transfer model. One or more hardware processors 202 may be coupled with interface devices such as a network interface 208 for communicating with remote systems, for example, via a network, and an input/output interface 210 for communicating with input and/or output devices such as a keyboard, mouse, display, and/or others.

Figure 3:
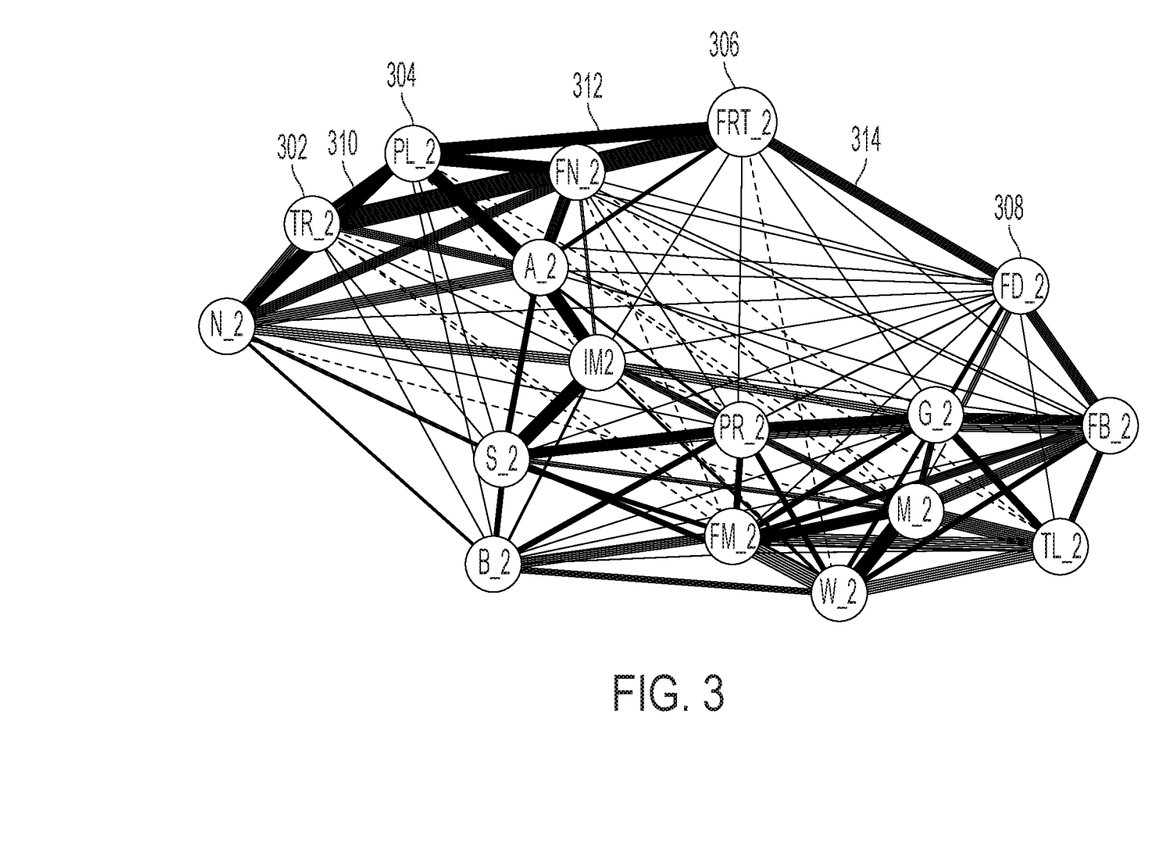
FIG. 3 is a diagram illustrating a map of model space in one embodiment.

FIG. 3 is a diagram illustrating a map of model space in one embodiment. A node represents a model (e.g., a neural network model) trained for a task. Different nodes represent different models trained for their respective specific tasks. For example, a node 302 may represent a model trained to recognize a tree or trees, and may have been trained based on image data associated with trees; As another example, a node 304 may represent a model trained to identify a plant or plants, and may have been trained based on image data associated with plants; Yet as another example, a node 306 may represent a model trained to recognize a fruit or fruits, and may have been trained using training data associated with fruits; Still as another example, a node 308 may represent a model trained to identify food, and may have been trained using training data including images of food; and so forth. The lines or edges between the nodes represent distances between the models representing the similarity of data sets used in training those models. For example, an edge 310 represents the similarity distance or metric between the data set used to train the model at node 302 and the data set used to train the model at node 304; an edge 312 represents the similarity distance or metric between the data set used to train the model at node 304 and the data set used to train the model at node 306; an edge 314 represents the similarity distance or metric between the data set used to train the model at node 306 and the data set used to train the model at node 308; and so forth.

Figure 4:
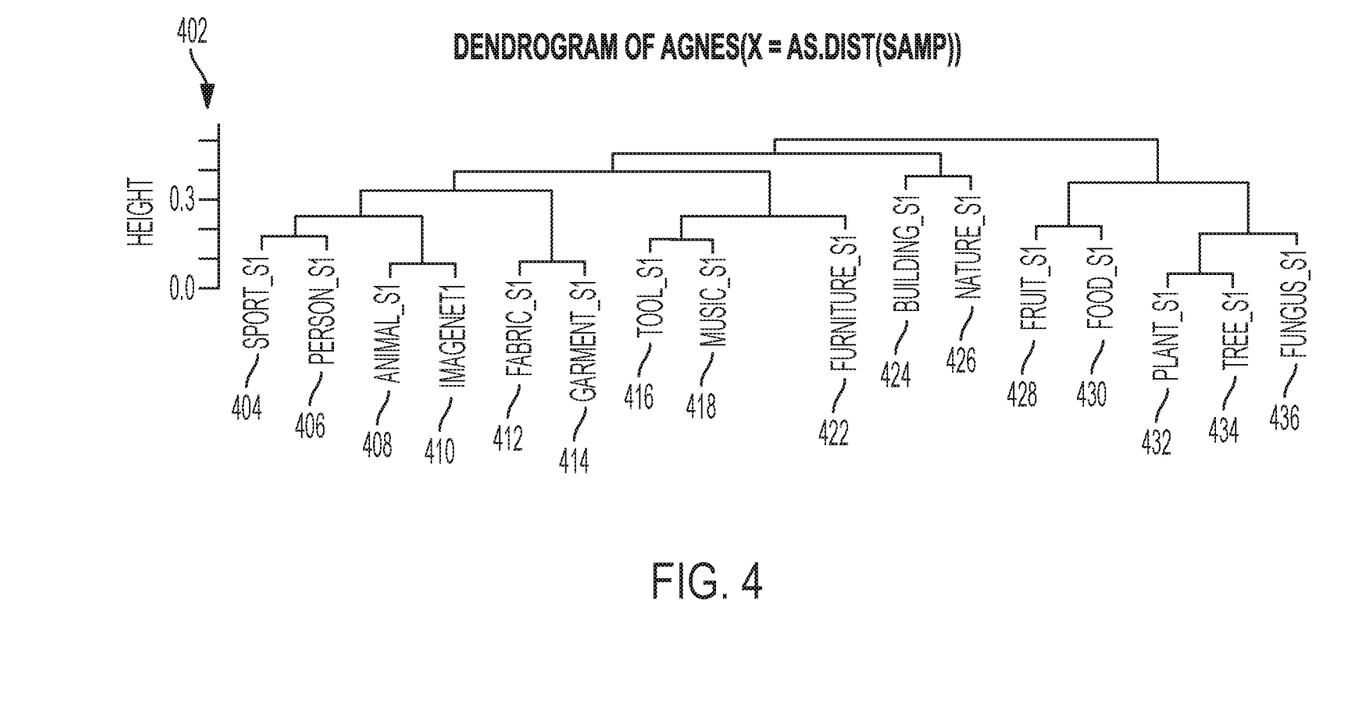
FIG. 4 is a diagram illustrating a cluster dendrogram of categories in one embodiment.

FIG. 4 is a diagram illustrating a cluster dendrogram of categories in one embodiment. A clustering technique can include hierarchical agglomerative clustering (Agnes). Distances between categories are shown by a height bar 402. Reference items 404-436 show examples of different categories in the example dendrogram in an embodiment. Models can be sorted by agnes, reweighted with data size, reweighted by distance to generalists such as imageNet1k, reweighted by training time, and/or compared to existing transfer models. As an example, it may be determined that for a given sample data set, combining source data sets of models for plant 432, tree 434 and fungus 436 to train a new transfer model may provide the best marginal performance gain. As another example, it may be determined that for another given sample data set, a merged hybrid model trained using source data sets used to train models for tool 416, and music 418 can be identified as containing a set of features that could serve as a strong transfer model. In another aspect, such a dendrogram can depict how a target data set correlates to one or more source data sets based on assessed similarity metrics.

Figure 5:
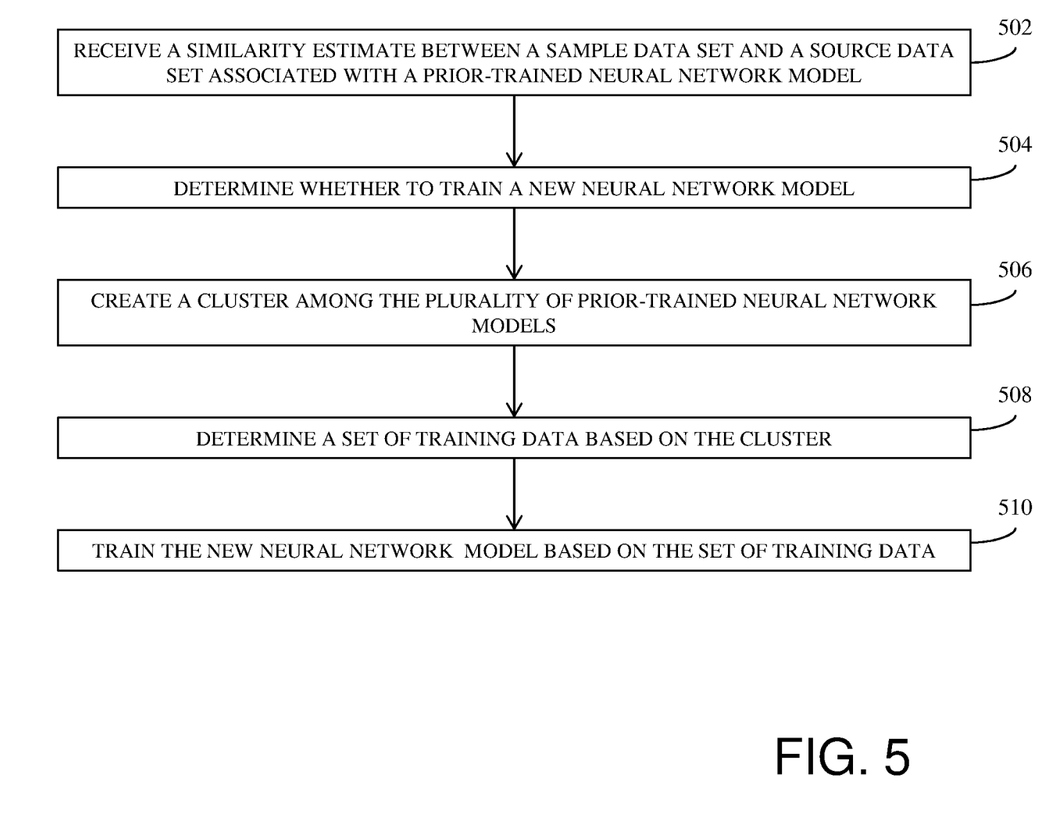
FIG. 5 is a diagram illustrating a method in one embodiment.

FIG. 5 is a diagram illustrating a method in one embodiment. The method can be performed by at least one hardware processor. At 502, a similarity estimate between a sample data set and a source data set associated with a prior-trained neural network model is received. A plurality of similarity estimates corresponding to a plurality of source data sets associated with a plurality of prior-trained neural network models can be received. The plurality of prior-trained neural network models may be stored as a library of pre-existing models. For instance, the plurality prior-trained neural network models can be different pre-existing base models for transfer learning, which are pre-trained based on different source data sets.

A similarity estimate can represent a distance between the sample data set and a source data set of a prior-trained neural network model. A source data set associated with a prior-trained neural network model includes a training data set used to train that prior-trained neural network model. A similarity estimate can be determined based on comparing a feature vector of a target layer of the prior-trained neural network model produced by passing the sample data set in forward propagation through the prior-trained neural network model, with a feature vector of the target layer of the prior-trained neural network model produced by passing in forward propagation the source data set through the prior-trained neural network model.

At 504, at least based on the similarity estimates, whether to train a new neural network model is determined.

At 506, responsive to determining to train the new neural network model, a cluster can be created among the plurality of prior-trained neural network models. A cluster can be created based on feature vectors produced by passing, in forward propagation, the sample data through the plurality of prior-trained neural network models.

At 508, a set of training data based on the cluster can be determined. For example, a set of training data can be determined based on combining the source data sets used in training the prior-trained neural network models identified in the cluster. Combining may include aggregating the source data sets as the training data. For instance, if prior-trained neural network model 1 and prior-trained neural network 2 are identified in the cluster, the training data for the new neural network model can include source data set 1 (used in training prior-trained neural network model 1)+source data set 2 (used in training prior-trained neural network model 2).

At 510, the new neural network model can be trained based on the set of training data. For instance, the new neural network model is trained as a base model for transfer learning. The new neural network model can be used as a model for transfer learning for performing a task associated with the sample data set, and may provide better performance enhancement than existing prior-trained models.

Figure 6:
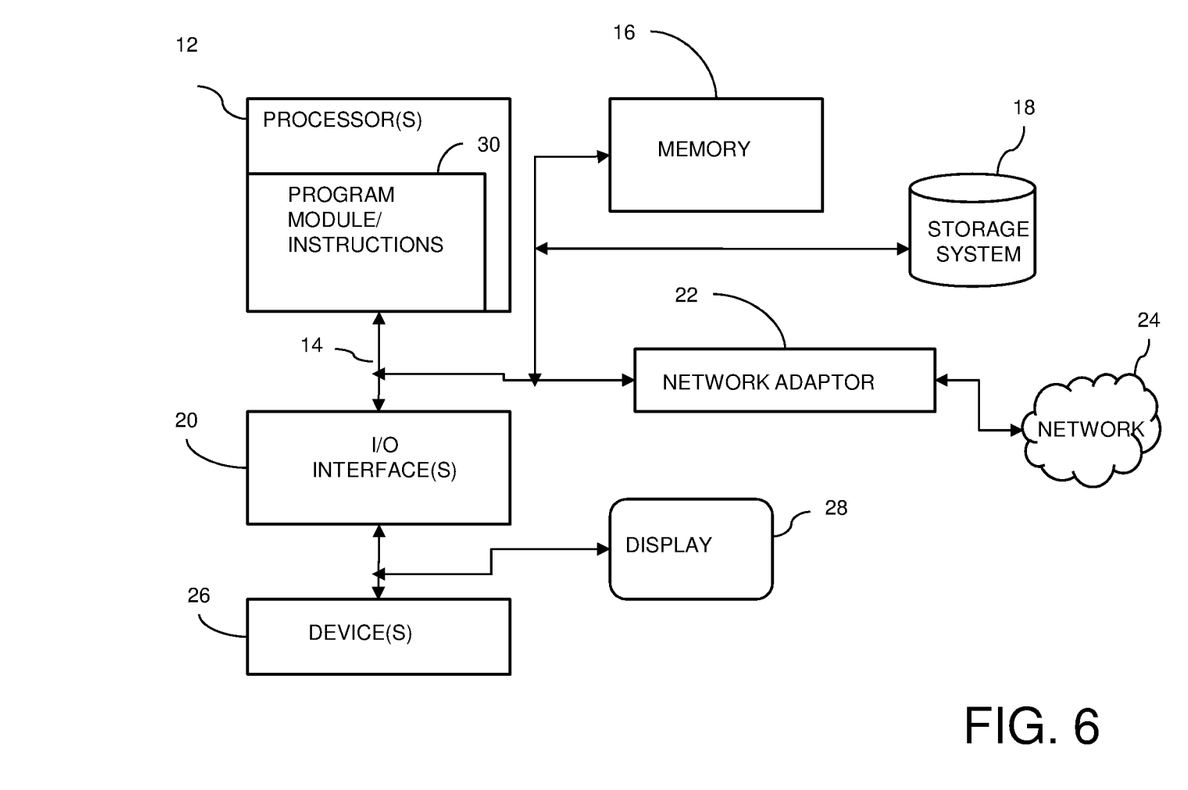
FIG. 6 illustrates a schematic of an example computer or processing system that may implement a system in one embodiment.

FIG. 6 illustrates a schematic of an example computer or processing system that may implement a system in one embodiment of the present disclosure. The computer system is only one example of a suitable processing system and is not intended to suggest any limitation as to the scope of use or functionality of embodiments of the methodology described herein. The processing system shown may be operational with numerous other general purpose or special purpose computing system environments or configurations. Examples of well-known computing systems, environments, and/or configurations that may be suitable for use with the processing system shown in FIG. 6 may include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

The computer system may be described in the general context of computer system executable instructions, such as program modules, being executed by a computer system. Generally, program modules may include routines, programs, objects, components, logic, data structures, and so on that perform particular tasks or implement particular abstract data types. The computer system may be practiced in distributed cloud computing environments where tasks are performed by remote processing devices that are linked through a communications network. In a distributed cloud computing environment, program modules may be located in both local and remote computer system storage media including memory storage devices.

The components of computer system may include, but are not limited to, one or more processors or processing units 12, a system memory 16, and a bus 14 that couples various system components including system memory 16 to processor 12. The processor 12 may include a module 30 that performs the methods described herein. The module 30 may be programmed into the integrated circuits of the processor 12, or loaded from memory 16, storage device 18, or network 24 or combinations thereof.

Bus 14 may represent one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system may include a variety of computer system readable media. Such media may be any available media that is accessible by computer system, and it may include both volatile and non-volatile media, removable and non-removable media.

System memory 16 can include computer system readable media in the form of volatile memory, such as random access memory (RAM) and/or cache memory or others. Computer system may further include other removable/non-removable, volatile/non-volatile computer system storage media. By way of example only, storage system 18 can be provided for reading from and writing to a non-removable, non-volatile magnetic media (e.g., a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 14 by one or more data media interfaces.

Computer system may also communicate with one or more external devices 26 such as a keyboard, a pointing device, a display 28, etc.; one or more devices that enable a user to interact with computer system; and/or any devices (e.g., network card, modem, etc.) that enable computer system to communicate with one or more other computing devices. Such communication can occur via Input/Output (I/O) interfaces 20.

Still yet, computer system can communicate with one or more networks 24 such as a local area network (LAN), a general wide area network (WAN), and/or a public network (e.g., the Internet) via network adapter 22. As depicted, network adapter 22 communicates with the other components of computer system via bus 14. It should be understood that although not shown, other hardware and/or software components could be used in conjunction with computer system. Examples include, but are not limited to: microcode, device drivers, redundant processing units, external disk drive arrays, RAID systems, tape drives, and data archival storage systems, etc.

It is understood in advance that although this disclosure may include a description on cloud computing, implementation of the teachings recited herein are not limited to a cloud computing environment. Rather, embodiments of the present invention are capable of being implemented in conjunction with any other type of computing environment now known or later developed. Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 7:
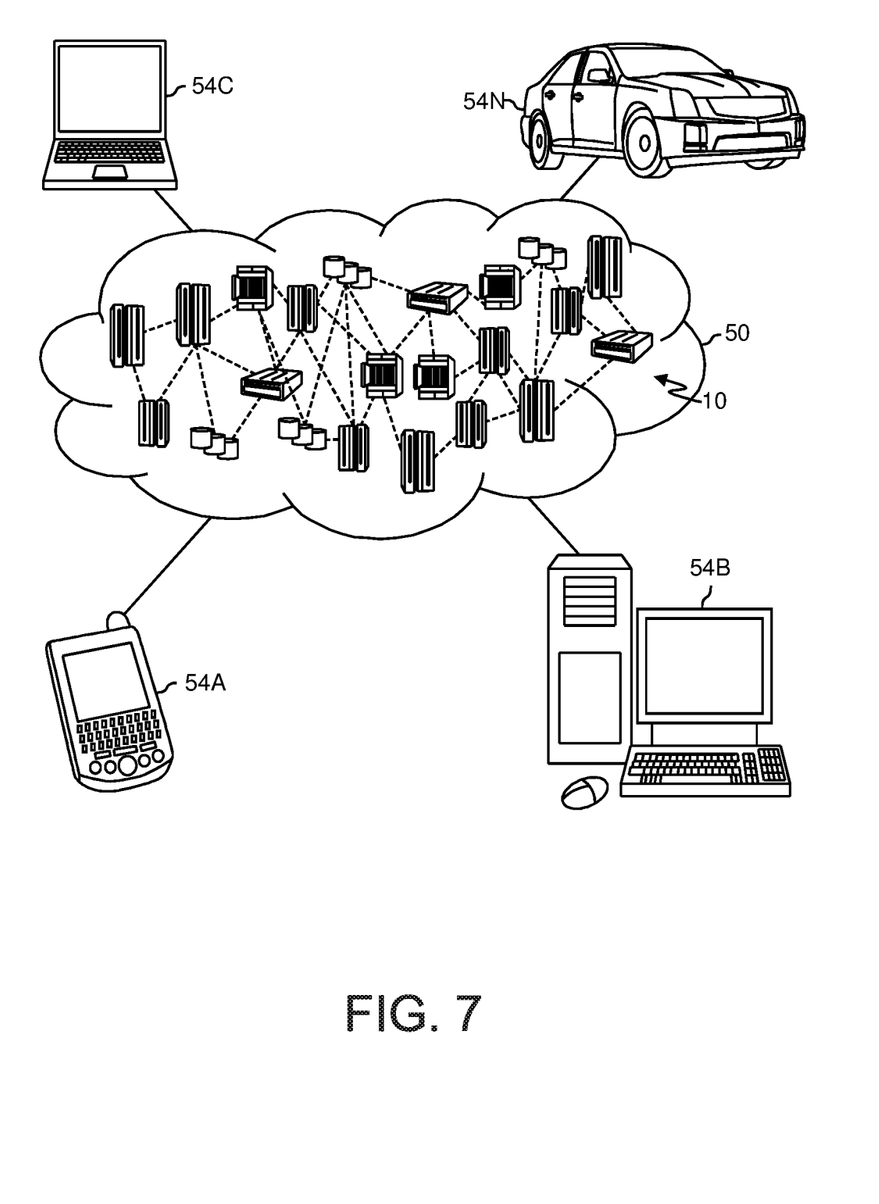
FIG. 7 illustrates a cloud computing environment in one embodiment.

Referring now to FIG. 7 an illustrative cloud computing environment 50 is depicted. As shown, cloud computing environment 50 includes one or more cloud computing nodes 10 with which local computing devices used by cloud consumers, such as personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 7 are intended to be illustrative only and that computing nodes 10 and cloud computing environment 50 can communicate with any type of computerized device over any type of network and/or network addressable connection (e.g., using a web browser).

Figure 8:
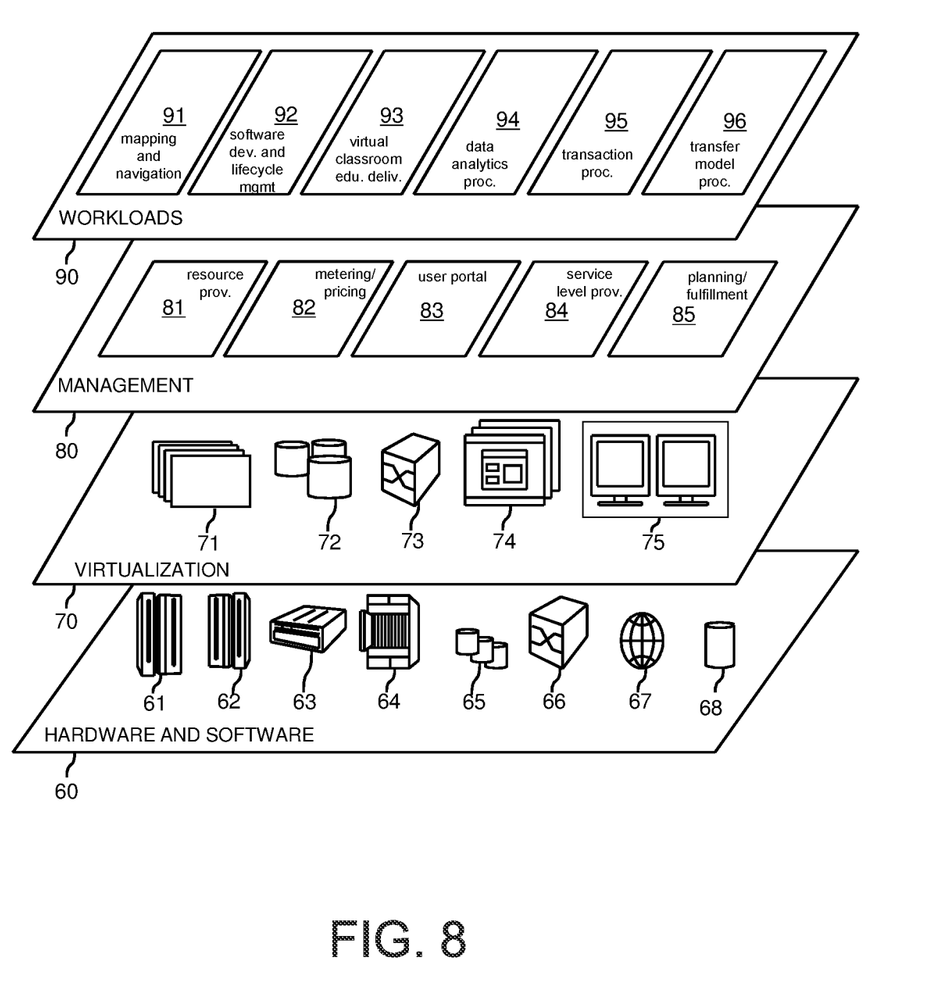
FIG. 8 illustrates a set of functional abstraction layers provided by a cloud computing environment in one embodiment of the present disclosure.

Referring now to FIG. 8, a set of functional abstraction layers provided by cloud computing environment 50 (FIG. 7) is shown. It should be understood in advance that the components, layers, and functions shown in FIG. 8 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and transfer model processing 96.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements, if any, in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method comprising:
    receiving a similarity estimate between a sample data set and a source data set, wherein the sample data set is associated with a target machine learning task, wherein the source data set is associated with a prior-trained neural network model and was used as a training data set used in training the prior-trained neural network model, wherein a plurality of similarity estimates is received corresponding to a plurality of source data sets associated with a plurality of prior-trained neural network models, the similarity estimate determined based on outputs of a hidden layer of the prior-trained neural network model generated using the sample data set and outputs of the hidden layer of the prior-trained neural network model generated using the source data set, each of the plurality of similarity estimates determined based on a distance between the sample data set and a corresponding one of the plurality of source data sets;

determining, at least based on the similarity estimates being above a predefined distance threshold, to train a new neural network model, the similarity estimates being above the predefined distance indicating a gap in areas covered by the source data sets used in training the plurality of prior-trained neural network models;

responsive to determining to train the new neural network model, creating a cluster among the plurality of prior-trained neural network models by running at least the plurality of prior-trained neural network models using the sample data set, clustering the prior-trained neural network models into different clusters using activations of a hidden layer of the prior-trained neural network model generated using the sample data set, and selecting the cluster closest to the sample data set;

determining a set of training data based on the cluster, wherein source data sets used in training a plurality of prior-trained neural network models in the cluster are combined for use as at least part of the set of training data; and training the new neural network model based on the set of training data.

2. The method of claim 1, wherein the new neural network model is trained as a base model for transfer learning.

3. The method of claim 1, wherein the creating a cluster comprises creating the cluster based on feature vectors of hidden layers produced by passing, in forward propagation, the sample data set through the plurality of prior-trained neural network models.

4. The method of claim 1, wherein the plurality of prior-trained neural network models are stored as a library of pre-existing models.

5. The method of claim 1, wherein the new neural network model is trained beginning with a random initial set of parameters.

6. The method of claim 1, wherein the new neural network model is trained starting with a set of parameters computed in at least one of the plurality of prior-trained neural network models.

7. The method of claim 1, wherein the new neural network model is trained using at least one hyperparameter used in at least one of the plurality of prior-trained neural network models.

8. A system comprising:
a hardware processor;
a memory device coupled with the hardware processor;
the hardware processor operable to at least:
receive a similarity estimate between a sample data set and a source data set, wherein the sample data set is associated with a target machine learning task, wherein the source data set is associated with a prior-trained neural network model and was used as a training data set used in training the prior-trained neural network model, wherein a plurality of similarity estimates is received corresponding to a plurality of source data sets associated with a plurality of prior-trained neural network models, the similarity estimate determined based on outputs of a hidden layer of the prior-trained neural network model generated using the sample data set and outputs of the hidden layer of the prior-trained neural network model generated using the source data set, each of the plurality of similarity estimates determined based on a distance between the sample data set and a corresponding one of the plurality of source data sets;

determine, at least based on the similarity estimates being above a predefined distance threshold, to train a new neural network model, the similarity estimates being above the predefined distance indicating a gap in areas covered by the source data sets used in training the plurality of prior-trained neural network models;

responsive to determining to train the new neural network model, create a cluster among the plurality of prior-trained neural network models by at least running the plurality of prior-trained neural network models using the sample data set, clustering the prior-trained neural network models into different clusters using activations of a hidden layer of the prior-trained neural network model generated using the sample data set, and selecting the cluster closest to the sample data set;

determine a set of training data based on the cluster, wherein source data sets used in training a plurality of prior-trained neural network models in the cluster are combined for use as at least part of the set of training data; and train the new neural network model based on the set of training data.

9. The system of claim 8, wherein the new neural network model is trained as a base model for transfer learning.

10. The system of claim 8, wherein the hardware processor creates the cluster based on feature vectors of hidden layers produced by passing, in forward propagation, the sample data through the plurality of prior-trained neural network models.

11. The system of claim 8, wherein the plurality of prior-trained neural network models are stored as a library of pre-existing models.

12. The system of claim 8, wherein the new neural network model is trained beginning with a random initial set of parameters.

13. The system of claim 8, wherein the new neural network model is trained starting with a set of parameters computed in at least one of the plurality of prior-trained neural network models.

14. The system of claim 8, wherein the new neural network model is trained using at least one hyperparameter used in at least one of the plurality of prior-trained neural network models.

15. A computer program product comprising a computer readable storage medium having program instructions embodied therewith, the program instructions executable by a processor to cause the processor to:
receive a similarity estimate between a sample data set and a source data set, wherein the sample data set is associated with a target machine learning task, wherein the source data set is associated with a prior-trained neural network model and was used as a training data set used in training the prior-trained neural network model, wherein a plurality of similarity estimates is received corresponding to a plurality of source data sets associated with a plurality of prior-trained neural network models, the similarity estimate determined based on outputs of a hidden layer of the prior-trained neural network model generated using the sample data set and outputs of the hidden layer of the prior-trained neural network model generated using the source data set, each of the plurality of similarity estimates determined based on a distance between the sample data set and a corresponding one of the plurality of source data sets;

determine, at least based on the similarity estimates being above a predefined distance threshold, to train a new neural network model, the similarity estimates being above the predefined distance indicating a gap in areas covered by the source data sets used in training the plurality of prior-trained neural network models;

responsive to determining to train the new neural network model, create a cluster among the plurality of prior-trained neural network models by at least running the plurality of prior-trained neural network models using the sample data set, clustering the prior-trained neural network models into different clusters using activations of a hidden layer of the prior-trained neural network model generated using the sample data set, and selecting the cluster closest to the sample data set;

determine a set of training data based on the cluster, wherein source data sets used in training a plurality of prior-trained neural network models in the cluster are combined for use as at least part of the set of training data; and train the new neural network model based on the set of training data.

16. The computer program product of claim 15, wherein the new neural network model is trained as a base model for transfer learning.

17. The computer program product of claim 15, wherein the processor is caused to create the cluster based on feature vectors of hidden layers produced by passing, in forward propagation, the sample data through the plurality of prior-trained neural network models.

18. The computer program product of claim 15, wherein the new neural network model is trained beginning with a random initial set of parameters.

19. The computer program product of claim 15, wherein the new neural network model is trained starting with a set of parameters computed in at least one of the plurality of prior-trained neural network models.

20. The computer program product of claim 15, wherein the new neural network model is trained using at least one hyperparameter used in at least one of the plurality of prior-trained neural network models.

* * * * *